United States Patent Office 3,203,320
Patented Aug. 31, 1965

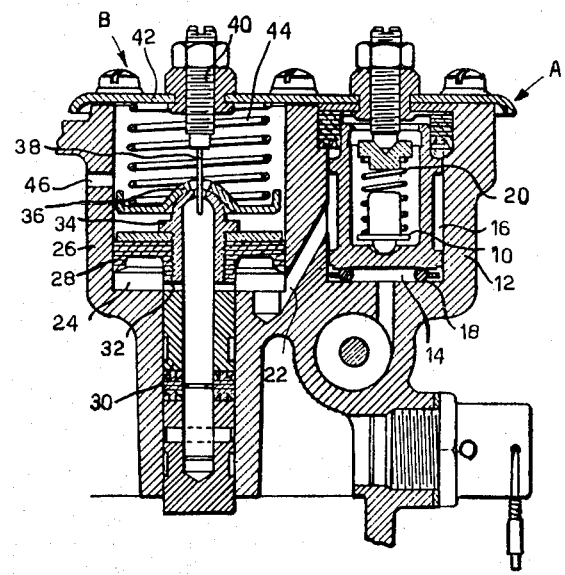

3,203,320
CLEANING DEVICE FOR PISTON PORT MEANS IN A PRESSURE REGULATOR
Giuseppe Alfieri, Milan, Italy, assignor to Fabbrica Italiana Magneti Marelli S.p.A., Milan, Italy, a corporation of Italy
Filed Aug. 1, 1962, Ser. No. 213,986
Claims priority, application Italy, Aug. 30, 1961, 15,738/61
5 Claims. (Cl. 92—87)

The present invention relates to a device adapted to be applied to pressure regulators, and particularly to the pressure regulators of pneumatic plants with a plurality of sections for cleaning the out-put or blow off ports so as to prevent clogging of these ports.

In a pneumatic plant with a plurality of sections the regulation of the operating pressure to maintain this pressure within predetermined limits of maximum and minimum pressure is accomplished by a pressure regulator which is inserted in one of the sections, preferably in that section of the pneumatic plant which is more likely to have lowered air pressure because of a leakage or the like. However, a lowering of air pressure may occur in another section not under the control of the pressure regulator, rather than in the section in which the regulator is located, and in such a case the pressure regulator cannot operate in time to cause connection of the compressors to the pneumatic plant in such a way as to restore the operating pressure.

To prevent this disadvantage a calibrated hole is provided downstream of the regulation valve 10, said hole functioning to discharge air at a predetermined rate from the section under the control of the pressure regulator. In such a way, even though the pneumatic plant is inoperative, the pressure regulator operates at regular intervals. The calibrated hole serves to discharge the air from the servo control, actuating in a known way the idle running valve of the compressor (not shown) and the compressor output is connected to the blow off opening whenever the pressure regulator operates.

For obvious reasons the calibrated hole has a very small diameter, usually smaller than .5 mm. This hole may easily become clogged or obstructed thus preventing the desired pressure drop in the section under control of the regulator, and in this way hindering the intended operation of the pressure regulator and causing other trouble. The obstruction of the calibrated hole may even prevent the positioning of the valve which is associated with the compressor and which enables the compressor to run idle, and in such a situation the compressor does not operate and the air pressure falls to zero.

It is a purpose of this invention to eliminate such disadvantages. According to this invention the calibrated hole of the pressure regulator is associated with a needle or the like, one of such parts being operatively connected to a reciprocating part in such a way that, depending on the relative motion between the hole and associated needle, the dirt or other deposits in the calibrated hole are removed.

Advantageously, the calibrated hole is provided in the piston rod which controls the compressor idle running valve, and the needle is secured through adjustable members to a suitable support in such a way that the axial position of the needle can be adjusted with respect to the calibrated hole.

This expedient enables achievement of several advantages; first of all, it enables the use of a calibrated hole with a relatively large diameter which because of the size of the hole, is easily machined by means of the usual tools. It will be understood that the area of the hole which is effective for the passage of air is reduced by the size of the needle.

The invention is illustrated in a preferred embodiment thereof in the accompanying drawing, in which:

The single figure of the drawing illustrates in axial section the part of a pressure regulator servo control embodying the invention.

Referring to the figure of the drawing, A designates the pressure regulator of known kind such as that set forth in Patent No. 3,105,517, dated October 1, 1963. A valve 10 slides with suitable play in a cylinder 12 and defines in this cylinder two chambers 14 and 16. This valve is pressed against a ring gasket 18 on the bottom of cylinder 12 by a spring 20. The chamber 14 is connected in a known way to a compressor output and the ring chamber 16 communicates through a pipe with a chamber 24 provided in a cylinder 26 for a piston 28 which through its rod 30 actuates in a known way the valve associated with the compressor (not illustrated) which serves to put the compressor output in communication with the blow off opening. This cylinder 26 with piston 28 forms the servo-control B.

The piston rod has an axial bore according to the present invention and is connected to chamber 24 through radial holes 32.

The axial bore of the piston rod is closed in its upper part by a cap 34 provided with a calibrated hole 36, into which is introduced for a length the needle 38 secured to the end of a screw 40 engaged in the cover 42 which closes cylinder 26 at its top.

The chamber 44 of cylinder 26 opposite to chamber 24 is in communication through hole 46 with the atmosphere.

It is understood from the foregoing description that when the pressure which builds up in chamber 14 exceeds a predetermined rate the valve 10 is lifted and the compressed air passes through the slit between this valve 10 and the associated cylinder 12 into chamber 24 and lifts piston 28, which actuates the valve for the compressor idle running.

The air existing in chamber 24 blows off gradually through the calibrated hole as formed by bore 36 and associated needle 38, in a predetermined time. The motion of piston 28 causes the needle 38 to move within and relative to the calibrated hole so as to clean the calibrated hole, thus to make sure that air will blow off from chamber 24 and therefore also from chamber 16 of the pressure regulator A.

In practice the device can obviously undergo substantial modifications and changes without departing from the invention. The blow off cleaning device, instead of being applied to rod 30, may also be applied to valve 10 by suitable alteration to accommodate this change. For example, the calibrated hole could be provided in the wall of valve 10 in such a way that its axis is parallel to the axis of the valve.

Other modifications also may be made; for example, needle 38 could be conical or shaped in such a way as to achieve, depending on the position of bore 36, a passage having a predetermined cross section which is regulated by turning the screw 40.

It is to be understood that the device according to the invention can be embodied also as an independent member to be applied to the regulators or conventional servo-control-regulator units.

It is to be understood that the invention may take many forms and the structure which is employed may be varied in many ways without departing from the spirit of the invention or the scope of the appended claims.

I claim:
1. In a pressure regulating device, a casing, an air pas- sageway through said casing providing an air inlet and an air outlet, a cylinder within said casing and forming a part of said passageway, a piston within said cylinder containing a central opening therein which forms a part of said passageway, said piston having a cap over said opening containing an orifice, said piston being movable within said cylinder in response to predetermined air pressures at said inlet, and a needle within said orifice and positioned to move relative to said orifice upon movement of said piston.

2. A device as set forth in claim 1 including spring means between said casing and said cap and bearing against said cap to normally hold said piston in retracted position but yieldable in response to a predetermined air pressure at said inlet to permit movement of said piston to an advanced position within said cylinder.

3. In a pressure regulating device, a casing, an air passageway through said casing providing an air inlet and an air outlet, a cylinder within said casing, the rearward end of said cylinder being in communication with said inlet and the forward end of said cylinder being in communication with said outlet, a hollow piston within said cylinder, said piston having an opening which communicates with said rearward end of said cylinder and leads into the hollow of said piston, said piston having at its forward end an orifice which is axial of said piston and which leads from the hollow of the piston to said forward end of said cylinder, and a needle mounted in said casing and extending rearwardly and axially of said cylinder through said orifice, said piston being movable within said cylinder in response to predetermined air pressure at the rearward end of said cylinder to move said orifice axially with respect to said needle.

4. A device as set forth in claim 3 including a coil spring on the exterior of said piston, said spring being between said casing and the forward end of said piston for resiliently holding said piston in retracted position, said needle being disposed within said spring, said spring being yieldable to permit advancement of said piston in response to air pressure of a predetermined amount at said inlet thereby to produce relative movement between said orifice and said needle.

5. A device as set forth in claim 3 wherein said opening to the hollow of said piston is a hole through the side wall of said piston.

References Cited by the Examiner
UNITED STATES PATENTS

| | | | |
|---|---|---|---|
| 711,349 | 10/02 | Schlaepfer | 251—43 |
| 1,236,617 | 8/17 | Speakman | 137—244 XR |
| 1,806,925 | 5/31 | Trapper | 230—31 |
| 1,936,821 | 11/33 | Bizzarri | 230—31 |
| 2,068,102 | 1/37 | Gaines | 137—245.5 |
| 2,218,446 | 10/40 | Wright | 137—244 |
| 2,587,212 | 2/52 | Placette | 137—489.5 |
| 2,614,885 | 10/52 | Roell et al. | 137—244 XR |

MARTIN P. SCHWADRON, *Acting Primary Examiner.*

ISADOR WEIL, *Examiner.*